US012644005B2

(12) United States Patent
Letard

(10) Patent No.: US 12,644,005 B2
(45) Date of Patent: Jun. 2, 2026

(54) METHOD FOR PRODUCING A PHOTOLUMINESCENT COMPOSITION, PHOTOLUMINESCENT COMPOSITION OBTAINED AND METHOD FOR MAINTAINING LUMINANCE

(71) Applicant: OLIKROM, Pessac (FR)

(72) Inventor: Jean-François Letard, Canejan (FR)

(73) Assignee: OLIKROM, Pessac (FR)

( * ) Notice: Subject to any disclaimer, the term of this patent is extended or adjusted under 35 U.S.C. 154(b) by 1214 days.

(21) Appl. No.: 17/769,441

(22) PCT Filed: Dec. 13, 2019

(86) PCT No.: PCT/EP2019/085160
§ 371 (c)(1),
(2) Date: Apr. 15, 2022

(87) PCT Pub. No.: WO2020/120766
PCT Pub. Date: Jun. 18, 2020

(65) Prior Publication Data
US 2024/0124719 A1     Apr. 18, 2024

(30) Foreign Application Priority Data

Dec. 14, 2018     (FR) ...................................... 1872898

(51) Int. Cl.
*C09D 5/22*          (2006.01)
*C09D 7/61*          (2018.01)
(Continued)

(52) U.S. Cl.
CPC ................. *C09D 5/22* (2013.01); *C09D 7/61* (2018.01); *C09D 11/037* (2013.01); *C09D 11/50* (2013.01);
(Continued)

(58) Field of Classification Search
CPC .......... C09D 5/22; C09D 7/61; C09D 11/037; C09D 11/50; E01F 9/518; E01F 9/524; C09K 11/02
(Continued)

(56) References Cited

U.S. PATENT DOCUMENTS

2003/0080341 A1     5/2003   Sakano et al.
2006/0208260 A1*    9/2006   Sakuma .............. C04B 35/6261
                                                                    252/584
(Continued)

FOREIGN PATENT DOCUMENTS

EP          1460180 A1     9/2004
FR          2941236 A1     7/2010
(Continued)

*Primary Examiner* — Anita Nassiri-Motlagh
(74) *Attorney, Agent, or Firm* — Greer, Burns & Crain, Ltd.

(57)          ABSTRACT

A method for producing a photoluminescent composition and the composition obtained, in particular form granular photoluminescent compounds, chosen in particular, and not exclusively, from the following families, based on an inorganic matrix and a doping ion, the photoluminescent composition being intended to be introduced with at least one filler into a transparent matrix. The method comprises a preparation step of: —choosing a first photoluminescent compound PH1 with a particle size range comprising a peak centered on a value P1 corresponding to a particle diameter D1, —choosing at least one second photoluminescent compound PH2 with a particle size range comprising a peak centered on a value P2 corresponding to a particle diameter D2, —choosing the diameter D2 equal to the maximum measurement M1 of the volumetric space V1 freed by the presence of at least four juxtaposed particles of diameter D1. The invention also relates to the composition, the use of said composition and a method for maintaining luminance above a given threshold.

4 Claims, 5 Drawing Sheets

=4 PH1 + 1PH2 + 4x1/2 PH2 + 4 x ½ PH2

(51) Int. Cl.

| | |
|---|---|
| *C09D 11/037* | (2014.01) |
| *C09D 11/50* | (2014.01) |
| *C09K 11/02* | (2006.01) |
| *E01F 9/518* | (2016.01) |
| *E01F 9/524* | (2016.01) |

(52) U.S. Cl.
  CPC .............. *C09K 11/02* (2013.01); *E01F 9/518*
      (2016.02); *E01F 9/524* (2016.02)

(58) Field of Classification Search
  USPC .................................................... 252/301.36
  See application file for complete search history.

(56) References Cited

U.S. PATENT DOCUMENTS

| 2017/0283697 A1* | 10/2017 | Aboulaich | ........ C04B 35/62695 |
|---|---|---|---|
| 2018/0194996 A1* | 7/2018 | Frischeisen | .......... C09K 11/663 |

FOREIGN PATENT DOCUMENTS

| WO | WO9309189 A1 | 5/1993 |
|---|---|---|
| WO | WO2016027027 A1 | 2/2016 |

* cited by examiner

=4 PH1

=4 PH1 + 1PH2 + 4x1/2 PH2 + 4 x ¼ PH2

METHOD FOR PRODUCING A PHOTOLUMINESCENT COMPOSITION, PHOTOLUMINESCENT COMPOSITION OBTAINED AND METHOD FOR MAINTAINING LUMINANCE

CROSS-REFERENCE TO RELATED APPLICATIONS

This application is a U.S. National stage application of PCT/EP2019/085160 with the filing date of Dec. 13, 2019 and claiming the benefit of priority to French patent application FR 1872898 with the filing date of Dec. 14, 2018, the entire disclosure of both applications is herein incorporated by reference.

TECHNICAL FIELD

The invention relates to a method for producing a photoluminescent composition, and the photoluminescent composition obtained from the implementation of said method. The invention is also directed to a method for maintaining the luminance of a composition of this kind.

BACKGROUND

Photoluminescent coatings are known, in particular which are intended to be used for making the products coated therewith light-emitting after having been exposed to said light, this being achieved naturally, without any power source.

This phenomenon of photoluminescence is very well known, and a large number of mineral compounds have this property of absorption in one wavelength and return in another wavelength.

The photoluminescent particles are based on an inorganic matrix and a dopant ion. The inorganic matrices include, for example: $MAl_2O_4$(M=Ca, Sr, Ba, Mg), $MSiO_3$ (M=Cd, Ca, Sr, Ba, Mg), MS (M=Ca, Zn), $MSi_2O_7$(M=Si, Mg, Ca, A), $MSnO_4$ (M=Mg, Ca).

The rare-earth ions include, for example: $Ln^{3+}$:$Eu^{3+}$, $Eu^{2+}$, $Ce^{3+}$, $Tb^{3+}$, $Sm^{3+}$, $Pr^{3+}$, $Dy^{3+}$, $Er^{3+}$, $Tm^{3+}$, $Nd^{3+}$, or the ions of a transition metal such as $V^{3+}$, $Cu^{2+}$, $Mn^{2+}$, $Ti^{4+}$, $Sn^{2+}$, $Co^{2+}$, $Bi^{3+}$, $Pb^{2+}$, to name but a few.

There are numerous applications, for example in horizontal and vertical signaling. Rather than illuminating road information signs and consuming energy, it would be more sensible and ecological to have markings which can be seen, even in the absence of illumination.

The users could thus be guided in an entirely appropriate manner. In contrast, it is necessary not only for the photoluminescence density to be sufficient, but also for the effect to persist over the entire duration of absence of natural or artificial light.

The aim of these compositions is that of generating a photoluminescent power which is as high as possible, and also as lasting as possible.

It is thus necessary for the ratio of photoluminescent compounds with respect to the matrix receiving them to be improved.

The known compositions comprise a matrix, generally colorless, to which a set of inorganic fillers is added, which has the aim of making said composition opacifying in order to mask the substrate receiving said composition.

Indeed, in order for the photoluminescent effect to be increased, it is necessary both to increase the density and to mask the substrate.

The fillers required for making said composition opacifying have the disadvantage of representing a percentage of up to 50% of the matrix.

Thus, the percentage of photoluminescent mineral compounds remains necessarily low.

The mechanical wear may also be a real problem, because the compositions, once put in place on a substrate, for example a road paint, are subjected to mechanical wear by the passage of vehicles, which removes a portion of material and thus reduces the density of photoluminescent compounds which was already relatively low due to the high rate of fillers.

SUMMARY

The invention thus aims to overcome the problems of the compositions of the prior art, and to propose a method for producing a composition comprising high-density photoluminescent compounds, thus generating a strong photoluminescence, and a composition having high coverage, at a low rate of inorganic fillers, and this over a long duration, on account of the possibility of harnessing significant energy and of returning this energy over a long period.

The present invention is also directed to a method for maintaining the luminance of said composition above a given threshold.

For this purpose, the method for producing a photoluminescent composition, in particular from granular photoluminescent compounds PH, chosen in particular, and not exclusively, from the inorganic matrices doped with at least one ion, said photoluminescent composition being intended to be introduced with at least one inorganic filler into a transparent matrix, is characterized in that it comprises a production step, which consists in:

choosing a first photoluminescent compound PH1 with a particle size range comprising a peak centered on a value P1 corresponding to a particle diameter D1, choosing at least one second photoluminescent compound PH2 with a particle size range comprising a peak centered on a value P2 corresponding to a particle diameter D2, choosing the diameter D2 equal to the maximum measurement M1 of the volumetric space V1 freed by the presence of at least four juxtaposed particles of diameter D1.

More particularly, the method for producing a photoluminescent composition is characterized in that at least one inorganic filler is associated therewith, the particle size range of said at least one filler being chosen so as to have a peak centered on a value PC corresponding to a diameter less than the D2.

According to the invention, in the method, the matrices of the photoluminescent compounds are chosen from the following families: MAl2O4 (M=Ca, Sr, Ba, Mg), MSiO3 (M=Cd, Ca, Sr, Ba, Mg), MS (M=Ca, Zn), MSi2O7 (M=Si, Mg, Ca, Al), MSnO4 (M=Mg, Ca) and the dopant ions are chosen from the rare-earth ions: Ln3+: Eu3+, Eu2+, Ce3+, Tb3+, Sm3+, Pr3+, Dy3+, Er3+, Tm3+, Nd3+, or from the ions of a transition metal such as V3+, Cu2+, Mn2+, Ti4+, Sn2+, Co2+, Bi3+, Pb2+.

The opacifying fillers are chosen from titanium oxide, zinc oxide, barium sulfate, calcium carbonate, zirconium, or a mixture thereof.

The invention also covers a photoluminescent composition which is obtained by the method and comprises:

a first photoluminescent compound PH1 with a particle size range comprising a peak centered on a value P1 corresponding to a particle diameter D1, at least one second photoluminescent compound PH2 with a particle size range comprising a peak centered on a value P2 corresponding to a particle diameter D2, the diameter D2 also being equal to the maximum measurement M1 of the volumetric space V1 freed by the presence of at least four juxtaposed particles of diameter D1, the matrices of the photoluminescent compounds being chosen from the following families: $MAl_2O_4$ (M=Ca, Sr, Ba, Mg), $MSiO_3$ (M=Cd, Ca, Sr, Ba, Mg), MS (M=Ca, Zn), $MSi_2O_7$ (M=Si, Mg, Ca, Al), $MSnO_4$ (M=Mg, Ca) and the dopant ions being chosen from the rare-earth ions: $Ln_3+$: $Eu_3+$, $Eu_2+$, $Ce_3+$, $Tb_3+$, $Sm_3+$, $Pr_3+$, $Dy_3+$, $Er_3+$, $Tm_3+$, $Nd_3+$, or from the ions of a transition metal such as $V_3+$, $Cu_2+$, $Mn_2+$, $Ti_4+$, $Sn_2+$, $Co_2+$, $Bi_3+$, $Pb_2+$, and at least one opacifying filler.

In this composition, the opacifying fillers are chosen from titanium oxides, zinc oxide, barium sulfate, calcium carbonate, zirconium, or a mixture thereof.

The invention is also directed to a photoluminescent coating comprising a composition of this kind, mentioned above, and embedded in a transparent resin.

Said transparent resin is chosen from the following families: polyurethanes, acrylics, epoxides, alkyds.

The invention covers the photoluminescent uses, and in particular the use of a coating for producing a paint for road marking or for producing an ink for printing on paper, on polymer film, or on fabric.

The invention also relates to the additive master mix obtained from a composition of this kind, which can be used in injection or in extrusion of polymer matrices with a view to producing photoluminescent products.

BRIEF DESCRIPTION OF THE DRAWINGS

The present invention will now be described on the basis of embodiments which are purely illustrative and in no way limit the scope of the invention, and with reference to the accompanying drawings, in which.

DETAILED DESCRIPTION

Figure 1:
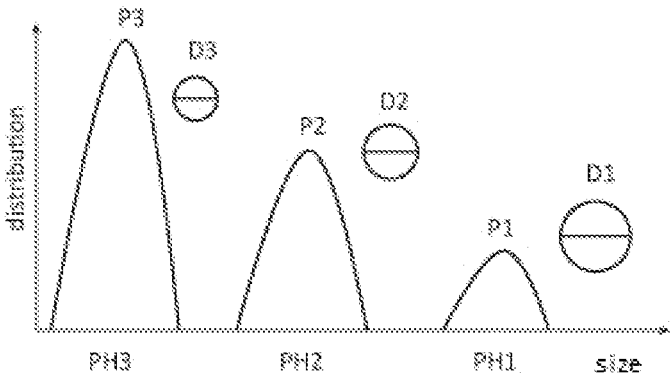
FIG. 1 shows a theoretical particle size distribution of the method according to the present invention, considering a structure comprising 3 particles PH1, PH2 and PH3.

The method according to the present invention consists in establishing a particle size distribution, comprising at least two particle size ranges, of different photoluminescent compounds PH1 and PH2. FIG. 1 shows an example of a distribution comprising three ranges of photoluminescent compounds PH1, PH2 and PH3.

Each range of photoluminescent compounds comprises a particle size peak P1, P2 and P3, said peaks being complementary.

The peak P1 corresponds to particles having a diameter D1, and the peak P2 corresponds to a diameter D2, and the peak P3 corresponds to a diameter D3.

The diameter D2 is chosen so as to substantially correspond to the maximum measurement M1 of the volumetric space V1 freed by the presence of at least four juxtaposed particles PH1 of diameter D1.

The following example comprises four juxtaposed particles PH1 of diameter D1.

Figure 2A:
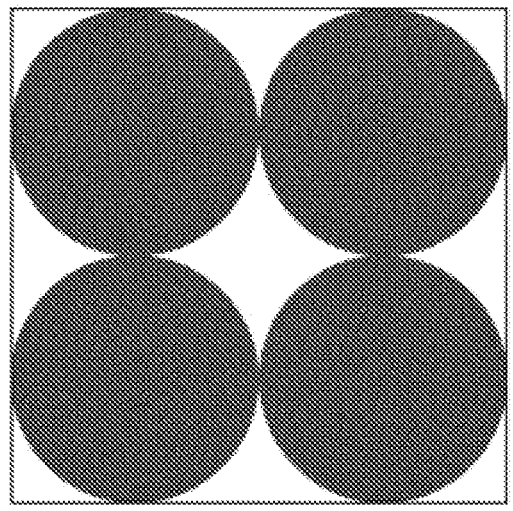
FIG. 2A is a diagram showing the theoretical geometrical distribution of photoluminescent materials according to the prior art, in the case of four (4) particles PH1 within a coating layer comprising said composition on a substrate.

In FIG. 2A it is noted that, in the case of a theoretical module of four particles, gaps are freed in which the fillers come to rest, in the compositions of the prior art (fillers not shown).

According to the method of the present invention, a combination of two photoluminescent particles PH1 and PH2 is chosen, the diameter D2 of the particles of PH2 corresponding to the diameter left free in the center by the square arrangement and in contact with the four particles PH1 of diameter D1.

Figure 2B:
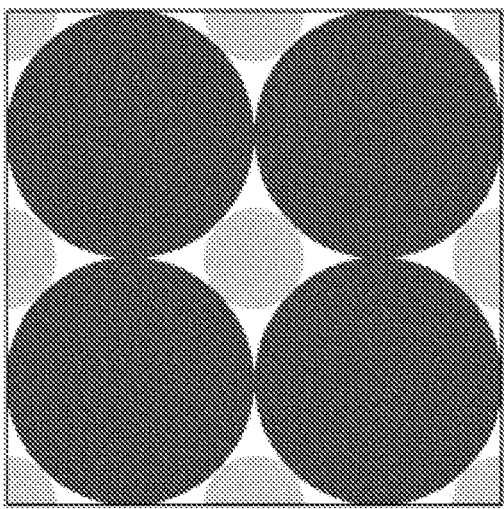
FIG. 2B is a diagram showing the theoretical geometrical distribution of a basic module, of photoluminescent materials according to the method of the invention in the case of two particles PH1 and PH2, within a coating layer comprising said composition on a substrate.
Figure 2B:

FIG. 2B shows a theoretical module comprising four particles PH1, 1 particle PH2, 4 half particles PH2, and four quarter particles PH2. The concepts of half and quarter are theoretical with respect to the module in question.

Thus, for one module, the volumetric filling is 4 photoluminescent particles PH1, 4 photoluminescent particles PH2, so as to provide the assembly with optimum thermodynamically stable compactness.

This considerably increases the volume of photoluminescent material per unit of volume.

"Complementary" means that the photoluminescent compounds PH1 and PH2 are chosen so as to limit the free inter-particle volumes between one another, and are of the same family.

In a practical manner, the method provides for passing the crushed photoluminescent compounds to the screen, so as to have the benefit of precise particle size ranges, which are as narrow as possible.

According to the method, the photoluminescent compounds are chosen, in terms of diameter and volumetric percentage of the mixture, so as to ensure optimal filling.

The at least two photoluminescent compounds are mixed and are subsequently integrated with at least one opacifying filler in at least one transparent matrix in order to develop a photoluminescent composition to be coated.

Depending on the nature of said matrix, the coating is considered to be a paint or an ink.

A paint is understood to mean, in the solvent or aqueous phase, a liquid or powdered product containing pigments, applied onto a surface, associated with protective, decorative or technical properties. The transparent resin for a paint in which the composition obtained by the method, and at least one opacifying filler, are integrated, is chosen, in a non-limiting manner, from the following families: polyurethanes, acrylics, epoxides, alkyds.

An ink which cures under ultraviolet, in the solvent or aqueous phase, is understood to be a liquid product for marking a paper or textile substrate, or a polymer film for example. The transparent resin for an ink in which the composition obtained by the method, and at least one opacifying filler, are integrated, is chosen, for example and in a non-limiting manner, from the following families: epoxy, acrylic, naphtha solvent, nitro-cellulosic, alkyds, polyurethanes, polyamides, ketones, polyesters.

The inorganic opacifying filler is chosen, for example and in a non-limiting manner, from the following families or a mixture thereof: titanium oxide, zinc oxide, barium sulfate, calcium carbonate, zirconium.

The transparent resin in which the composition obtained by the method, and at least one opacifying filler, are incorporated, is chosen, for example and in a non-limiting manner, from the following families: polyurethanes, acrylics, epoxides, alkyds.

The geometrical arrangement is obtained during the mixing of the particles of the at least two compounds PH1 and PH2, and the at least one filler associated with the particles of photoluminescent compounds. On account of the retained distribution and the percentage of each of the photoluminescent compounds chosen, this geometry is unique, since only this formation is thermodynamically stable, corresponding to a maximum compactness.

The fillers are also chosen in a particle size profile that is complementary to the particle size profiles of the photoluminescent compounds. The choice of the particle size peak is dictated such that the fillers fill in the inter-particle voids created by the at least two photoluminescent compounds used. The filler comprises mainly particles of a diameter less than that of the smallest of the photoluminescent particles, in order not to interfere, or at least to limit the interference.

It will be noted that the architecture of the particles corresponds to a thermodynamic equilibrium and, in the case of particles of just one diameter, the particles are positioned in a staggered manner, so as to limit the empty volumes and to provide better compactness. In contrast, when there are at least two types of particles, the thermodynamic equilibrium results in a geometry as shown, i.e. particles PH1 which are aligned perpendicularly, and particles PH2 which are arranged in the volumes left free, because this is the best possible compactness, and the architecture is thus stable. Moreover, in the case of the present invention, the particle size of the PH2s is chosen so as to be adapted to the inter-PH1 volume intended for receiving said particles PH2. This makes it possible to improve the density, and thus the coverage, while preventing masking of the photoluminescent compounds. The segregation phenomena of particles PH1, PH2 . . . PHn of the same family are impossible when the particles are of the same type, and such aggregations will not be stable. PH1 on one side and PH2 on the other, for example, is not thermodynamically possible.

Figure 3:
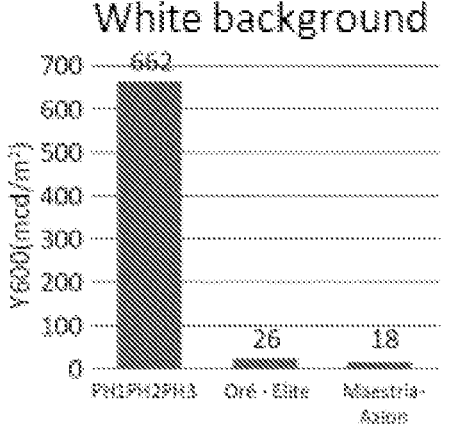
FIG. 3 shows a comparison of the luminescence, at 10 minutes, of a composition according to the present invention, obtained by the method according to the present invention, comprising two particles PH1 and PH2, with two commercial paints having the same pigment level and the same thickness, on two different black and white backgrounds.
Figure 4:
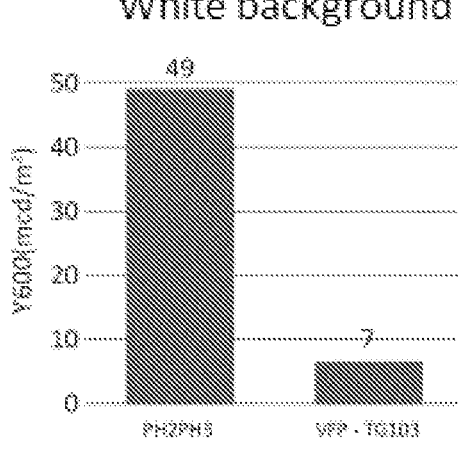
FIG. 4 shows the comparison of the luminescence, at 10 minutes, of a composition according to the present invention, obtained by the method according to the present invention, comprising two types if particles PH1 and PH2, with a commercial ink having the same pigment level and the same thickness.
Figure 4:
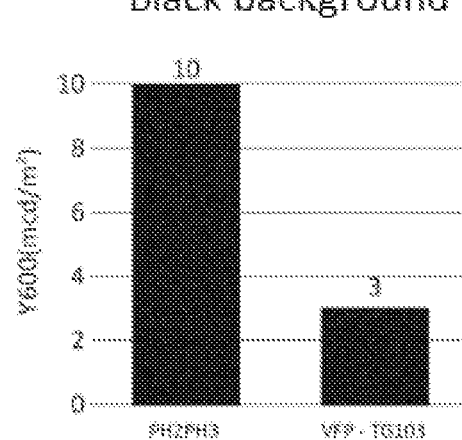
Figure 5:
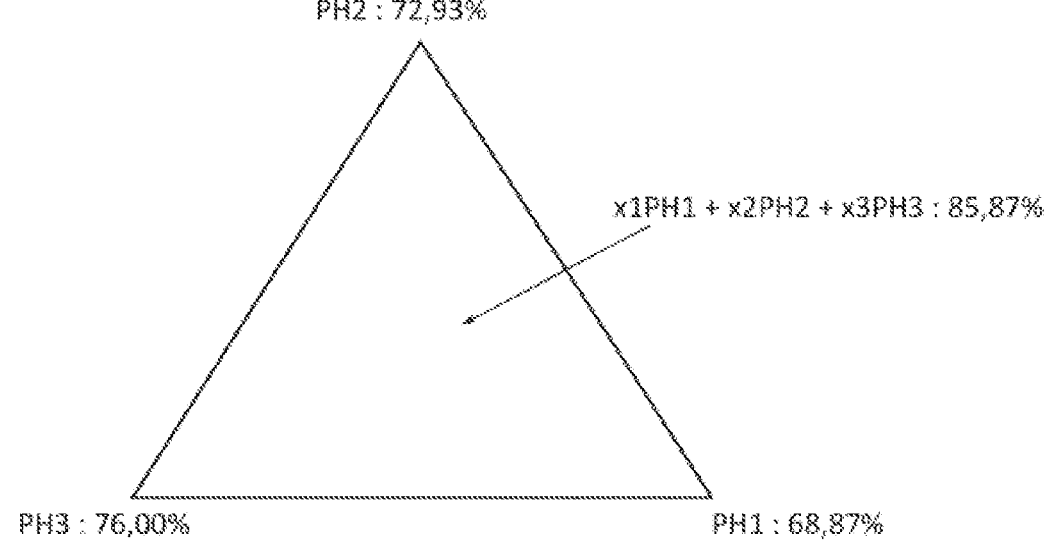
FIG. 5 shows the development of the coverage parameter of a photoluminescent varnish comprising three types of particles PH1, PH2 and PH3, in the form of a ternary plot.

This results in very significant increases in photoluminescence. Thus, FIG. 3 shows, on the left-hand graph, the results obtained on a white background, and on the right-hand graph, the results obtained on a black background, having a distribution of 3 types of particles PH1, PH2 and PH3, having peaks of diameters D1, D2 and D3, prepared according to the method of the present invention, in proportions P1, P2 and P3.

The comparison is performed on the basis of products marketed under the trade names Elite of paints of the company Oré Peinture, and Axion of paints of the company Maestria.

These results relate to the luminescence at 10 minutes (Yeo) after excitation (15 minutes under the lamp D65 X-Rite, 1500 lux) at the same insertion rate of photoluminescent pigments in the 3 tests, for a thickness of 500 μm, on a white background.

Indeed, as there is no photoluminescent paint, the comparative tests were carried out using commercial road paints, to each of which the same quantity of photoluminescent pigments was added, but without choosing the distribution; in this case a photoluminescent pigment marketed under the name JPA-388 by the company FOSHAN JULIANG Photoluminescent Pigments.

For the composition according to the present invention, produced on the basis of the method and introduced into a transparent resin matrix according to the invention, and thus on the basis of the choice of particle size distributions PH1/PH2/PH3, the luminescence values, expressed in millicandelas, at 10 minutes on a white background, are:

$662$ mCd/m$^2$ for PH1/PH2/PH3
$26$ mCd/m$^2$ for ELITE, and
$18$ mCd/m$^2$ for AXION.

The luminescence values, expressed in millicandelas, at 10 minutes ($Y_{600}$) after excitation (15 minutes under the lamp D65 X-Rite, 1500 lux) at the same insertion rate of photoluminescent pigments in the 3 tests, for a thickness of 500 μm, on a black background.

For the composition according to the present invention, produced on the basis of the method according to the invention, and thus on the basis of the choice of particle size distributions PH1/PH2/PH3, and the two commercial products compared, the following applies:

$379$ mCd/m$^2$ for PH1/PH2/PH3
$14$ mCd/m$^2$ for ELITE, and
$14$ mCd/m$^2$ for AXION.

In the same way, comparative tests are performed for inks, comparing a commercial ink, for example a white reference ink TG103 by the company VFP Inks, and an ink developed using a composition of photoluminescent pigments according to the method of the present invention.

The rate of insertion of photoluminescent pigments in the 2 tests is identical.

For the composition according to the present invention, produced on the basis of the method according to the invention, and thus on the basis of the choice of particle size distributions PH1PH2PH3 in a transparent resin matrix, and for the product compared, the luminescence values, expressed in millicandelas, at 10 minutes on a white background, are:

$49$ mCd/m$^2$ for PH1/PH2/PH3
$7$ mCd/m$^2$ for TG103.

For the composition according to the present invention, produced on the basis of the method according to the invention, and thus on the basis of the choice of particle size distributions PH2PH3, and for the product compared, the luminescence values, expressed in millicandelas, at 10 minutes on a black background, are:

10 mCd/m$^2$ for PH2/PH3

3 mCd/m$^2$ for TG103.

The synergistic effect of a composition according to the present invention, from a ternary with the photoluminescent particles PH1, PH2 and PH3 was also tested.

It is noted that the coverage varies and increases when a proportion of 1× PH of largest diameter, 2× PH2 of intermediate diameter, and 3× PH3 of small diameter is chosen.

A large diameter means for example 100, which results in an intermediate diameter which comes to rest in the freed volumes of:

$$D2=[(2×D1\sqrt{2})-(2×D1)]/2 \qquad [Math.1]$$

$$D2=[(2×100\sqrt{2})-(2×100)]/2 \qquad [Math.1]$$

$$D2=40 \qquad [Math.1]$$

It is the same for the photoluminescent particles of diameter D3 which come to rest in the spaces freed by the photoluminescent particles of diameters D1 and D2, the diameter D3 of which is therefore less than that of D2, which was itself less than D1.

Thus, the coverage of a composition established according to the method of the present invention results in particles having three different diameters D1, D2 and D3, with coverage capacities of:

PH1 of 68.87% coverage when they are used alone

PH2 of 72.93% coverage when they are used alone

PH3 of 76% coverage when they are used alone

In fact, it is found that a mixture according to the method of the present invention, having a proportion of 1× PH of largest diameter and greatest coverage, 2× PH2 of intermediate diameter and less coverage, and 3× PH3 of small diameter and even less coverage, obtains a coverage of the composition according to the invention of 85.87%, which is greater than that of a composition of particles having a mono distribution, centered on a diameter D1 or D2 or D3.

Figure 6:
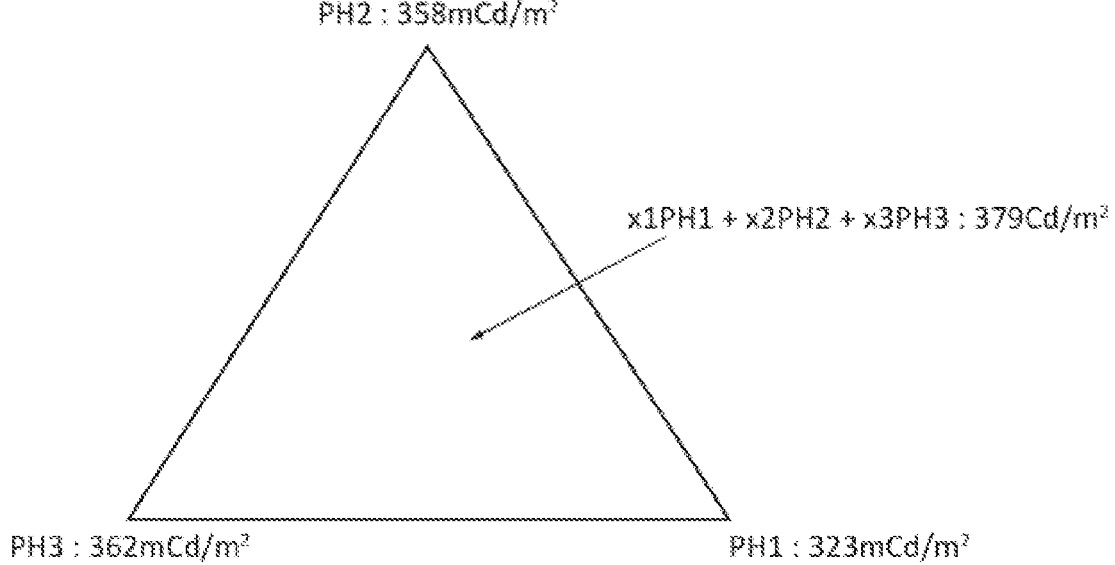
FIG. 6 is the same ternary plot showing the luminance values 10 minutes after excitation.

The percentages are expressed in number of particles. It is also possible to observe, in the ternary of FIG. 6, that each of the chosen compounds PH1, PH2 and PH3 has a luminance value at 10 minutes after excitation of 15 minutes under a D65 X-Rite, 1500 lux lamp, of 323 mCd/m$^2$, 358 mCd/m$^2$ and 362 mCd/m$^2$, respectively. It is noted that the ternary PH1PH2PH3, D1, D2 and D3 has a luminance of 379 mCd/m$^2$, which is greater than the luminance of each of them.

The mixture of photoluminescent particles, fillers and the at least one transparent resin makes it possible to obtain an additive master mix which can be used in injection or in extrusion of polymer matrices with a view to producing photoluminescent products.

Figure 7:
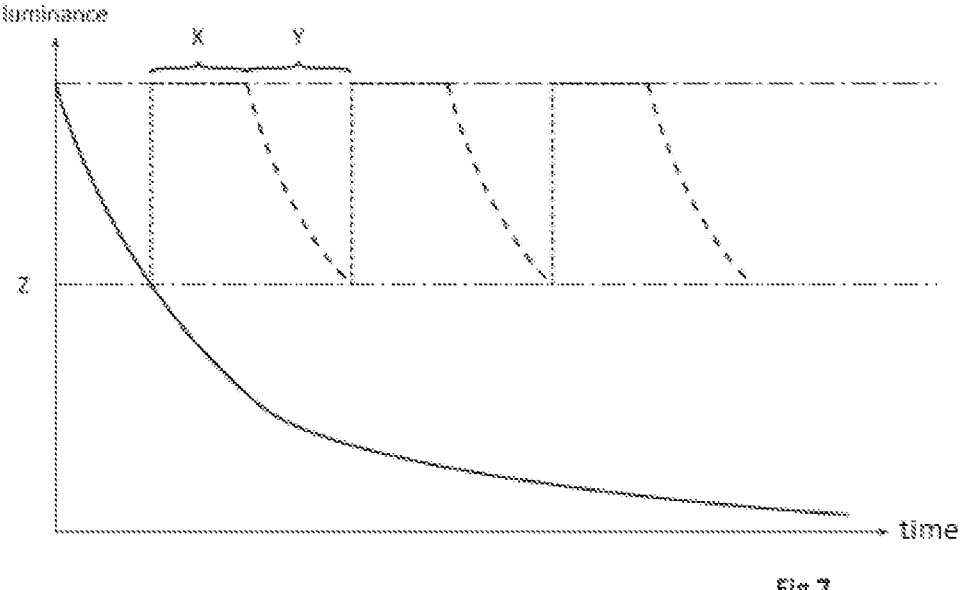
FIG. 7 is a theoretical graph showing the luminance maintenance.

According to the method of the present invention, a method is provided for maintaining the luminance above a given threshold Z. For this purpose, the method consists in regularly exciting the composition according to the present invention, once affixed to a substrate, before the value of the luminance reaches a value below said threshold Z, in FIG. 7, at the end of a duration Y. Thus, when a composition according to the invention is excited for the period X, the rate of luminance is at a maximum at the dotted lines and then, over time, the relaxation leads to a loss of luminance, and when the luminance reaches a threshold value Z, the method provides for re-excitation of the composition until reaching the maximum luminance. Thus, successive excitation makes it possible to maintain the luminance between the threshold Z and the maximum luminance. An indication of the durations is for example a re-excitation duration of 3 min, and a relaxation of 60 min.

Figure 8:
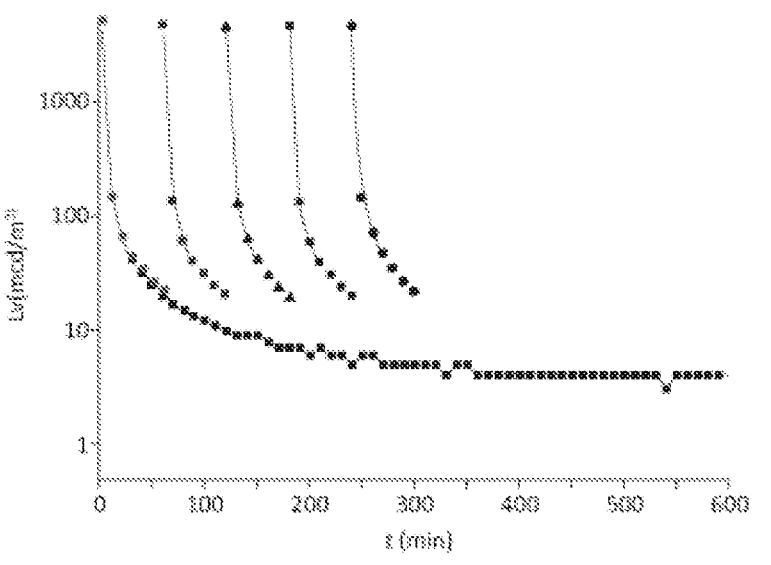
FIG. 8 shows an example of the luminance maintenance of an ink.

The graph of FIG. 8, relating to an acrylic resin-based ink and a composition according to the present invention, achieves actual values close to the theoretical one, the luminance remaining in the luminance range fixed at approximately 8 mCd/m$^2$. It is thus possible to keep a product illuminated, signage lasting a long period, with excitation of a very limited duration, in this case 3 min. The excitation and the re-excitations can be obtained for the specific embodiments such as road marking, by any means which may be street lighting, or specific lighting having a controlled duration and/or intensity.

The advantage of a composition according to the present invention is that it remains effective, with a sufficient luminance threshold, for very significant durations, including in the event of passage and if the coating on the substrate erodes. The composition according to the invention, which makes it possible to provide the same luminance in the mass, is also ready to receive a sufficient amount of energy during the excitation phase to return it during the relaxation phase. It is understood that what applies for the composition in its entirety is valid for the coating produced from said composition.

The invention claimed is:

1. A method for producing a photoluminescent composition from granular photoluminescent compounds PH1 and PH2, comprising:

choosing a first granular photoluminescent compound PH1 with a particle size range comprising a peak centered on a value P1 corresponding to a particle diameter D1 from the following compounds:

Group I having the formula MAl$_2$O$_4$ wherein M is a metal selected from Ca, Sr, Ba, or Mg;

Group II having the formula MSiO$_3$ wherein M is a metal selected from Cd, Ca, Sr, Ba, or Mg;

Group III having the formula MS wherein M is a metal selected from Ca or Zn;

Group IV having the formula MSi$_2$O$_7$ wherein M is selected from Si, Mg, Ca or Al; or Group V having the formula MS$_n$O$_4$ wherein M is a metal selected from Mg or Ca;

mixing the first granular photoluminescent compound PH1 with at least one second granular photoluminescent compound PH2 with a particle size range comprising a peak centered on a value P2 corresponding to a particle diameter D2, wherein the second photoluminescent compound PH2 is a compound in the same Group I, II, III, IV or V as the first photoluminescent compound PH1;

wherein the relationship between D1 and D2 is defined by the following equation:

$$D2=[(2×D1\sqrt{2})-(2×D1)]/2, \text{ and}$$

doping the first granular photoluminescent compound PH1 and the at least one second granular photoluminescent compound PH2 with at least one dopant ion selected from the following group consisting of rare-earth ions and transition metals: Ln$^{3+}$, Eu$^{3+}$, Eu$^{2+}$, Ce$^{3+}$, Tb$^{3+}$, Sm$^{3+}$, Pr$^{3+}$, Dy$^{3+}$, Er$^{3+}$, Tm$^{3+}$, Nd$^{3+}$, V$^{3+}$, Cu$^{2+}$, Mn$^{2+}$, Ti$^{4+}$, Sn$^{2+}$, Co$^{2+}$, Bi$^{3+}$, Pb$^{2+}$, and any combination thereof.

2. The method for producing a photoluminescent composition according to claim 1, wherein the method further comprises adding at least one filler, a particle size range of said at least one inorganic filler being chosen so as to have a peak centered on a value PC corresponding to a diameter D of less than the smallest diameter D1, D2 of the at least one photoluminescent compounds PH1 and PH2; and wherein the filler is an opacifying filler and said filler is selected from titanium oxide, zinc oxide, barium sulfate, calcium carbonate, zirconium, or a mixture thereof.

3. The method of claim 1 or 2, wherein the method further comprises embedding the composition in transparent resin.

4. The method of claim 3, wherein the transparent resin is selected from a polyurethane, acrylic, epoxide, or alkyd.

* * * * *